May 1, 1928. 1,667,980
F. MOTT
PROTECTIVE COVERING FOR VEHICLE TIRES
Filed July 19, 1926    2 Sheets-Sheet 1
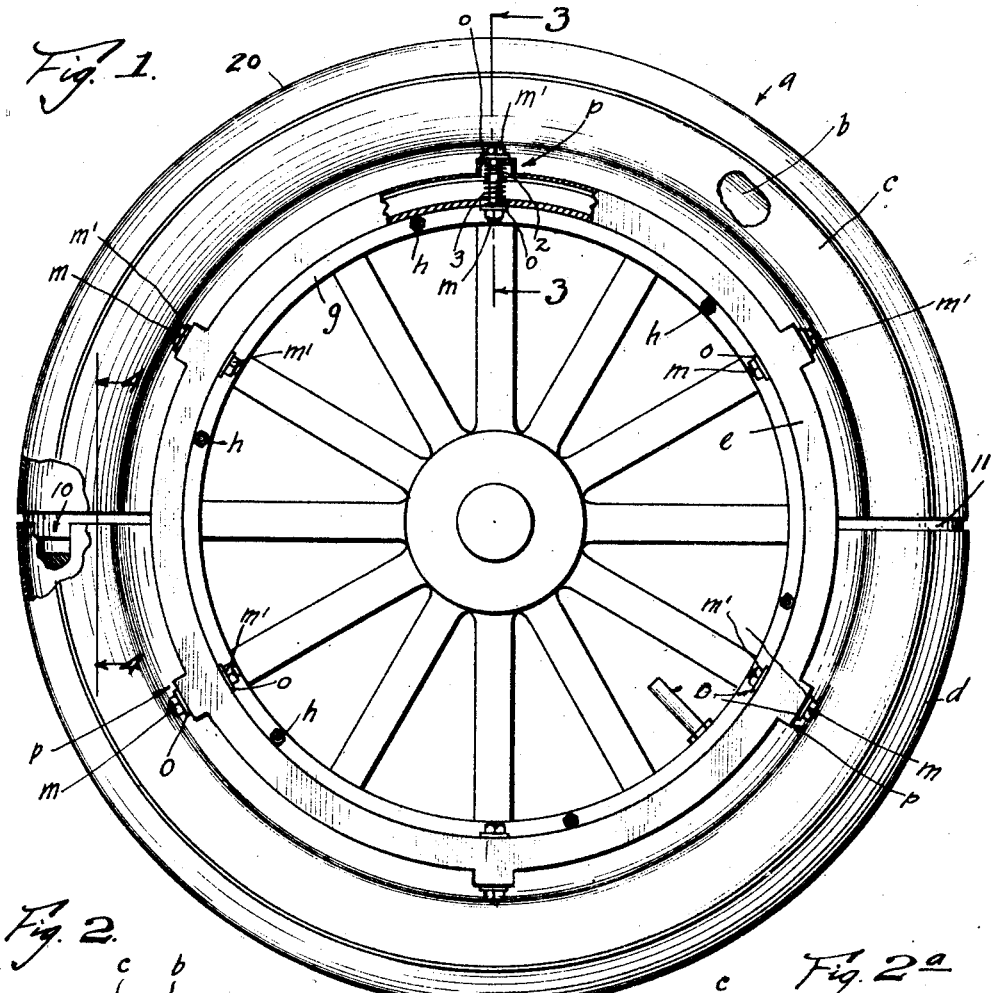
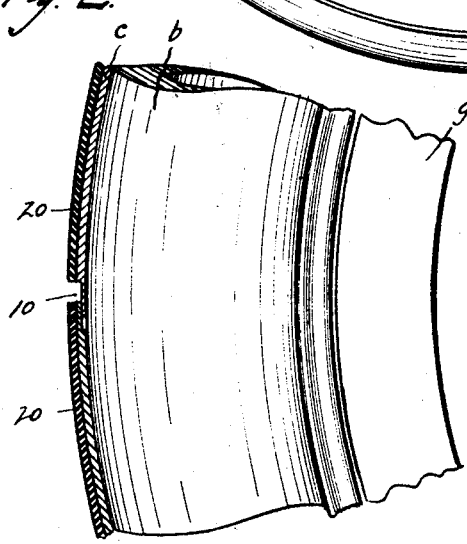
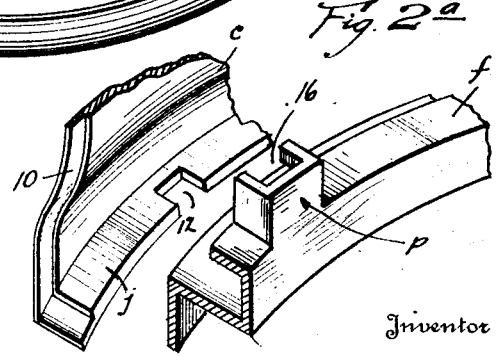
Inventor
Floyd Mott
By J. J. Geisler
Attorney

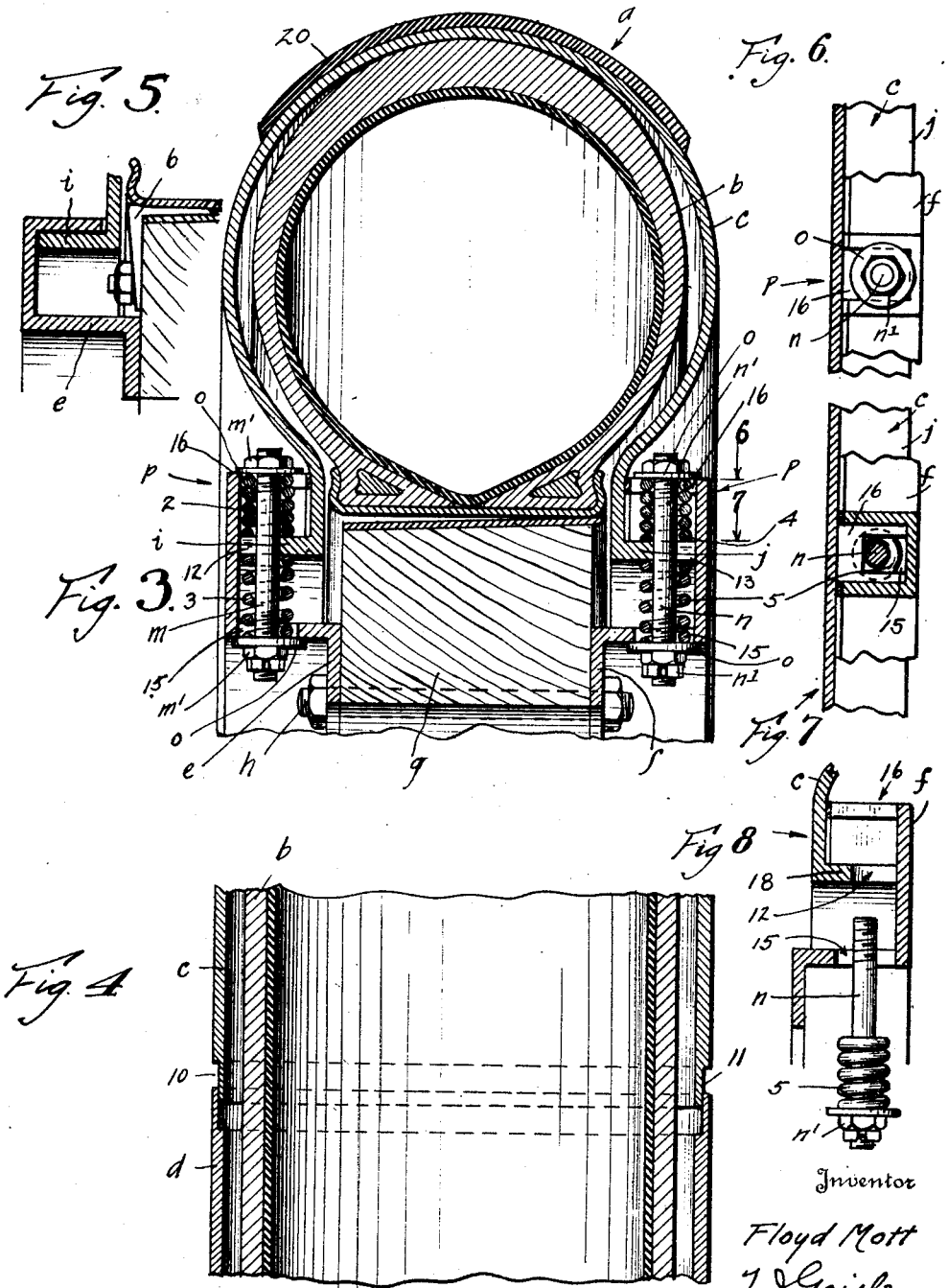

Patented May 1, 1928.

1,667,980

UNITED STATES PATENT OFFICE.

FLOYD MOTT, OF PORTLAND, OREGON.

PROTECTIVE COVERING FOR VEHICLE TIRES.

Application filed July 19, 1926. Serial No. 123,564.

My invention has for its object the providing of an efficient, yet simple metallic protective covering for the tires of vehicle wheels, especially the wheels of automobiles; thereby to eliminate punctures, also to reduce blow-outs and the wear on the tire; at the same time not interfering with the normal resiliency of the tire.

My invention furthermore has for its object so to construct and mount the protective covering of the tire on the latter and the wheel rim that when the tire is deflated, the protective covering will support the weight of the vehicle, and thus prevent injury to the tire.

A further object of my invention is so to construct my protective covering that it may be conveniently assembled on the wheel rim about the tire.

Other features of my invention, its details of construction and application are hereinafter fully described with reference to the accompanying drawings.

In the drawings:

Fig. 1 is a side elevation of an automobile wheel and tire with my protective covering mounted over the tire and secured to the felly of the wheel, and shows a portion of the supplementary rim broken away disclosing one of the radially disposed bolts by which my covering is held closely to the tire, and I similarly show in a section of the armor broken away the male and female joints of the two sections of my protective cover;

Fig. 2 is a side elevation of a fragment of a tire and wheel and shows a central longitudinal section of my protective covering in place over the tire and the rubber tread I provide on the periphery of the said covering;

Fig. 2ª is a perspective view of a fragment of the clamping means by which my protective covering is fixed to the felly of the wheel;

Fig. 3 is a transverse section on the line 3—3 of Fig. 1 showing my protective covering mounted over the tire, the position of the tire therein, and bolts and springs by which my protective covering is slightly adjustable to the pressure in the enclosed tire;

Fig. 4 is a fragmentary section taken on the line 4—4 of Fig. 1 illustrating the male and female joints between the two sections of my protective covering and shows the space provided between the sides of the tire and the covering;

Fig. 5 is a fragmentary transverse section of Fig. 1 showing the clamping means for holding the tire to the rim of the wheel;

Fig. 6 is a section taken on the line indicated by the arrow 6 of Fig. 3, showing the slot in the inturned flange of the supplementary rim;

Fig. 7 is a section taken on the line indicated by the arrow 7 of Fig. 3, showing the slot provided in the outturned flange on the inner periphery of my protective cover and illustrating the means by which the lateral movement is provided for the radially disposed bolts which fasten the cover to the supplementary rim; and Fig. 8 is a fragmentary section of the supplementary rim and outturned flange on the inner periphery of the protective cover, showing more clearly certain details of construction.

Referring now to Fig. 1 the auxiliary protective covering $a$ is mounted over the tire $b$ and comprises two sections $c$ and $d$ which are held in place by the inturned channel-like extensions of the supplementary rims $e$ and $f$ which are fastened to the felly $g$ of the wheel by transverse bolts $h$, as more clearly seen in Fig. 3.

The protective covering $a$ is provided with outturned flanges $i$ and $j$ on each side of its inner periphery, and in which are a number of slots 12 and 13, respectively. A number of bolts $m$ and $n$ are disposed about the supplementary rims in housings as at $p$, in which openings 15 are provided in the lower portion of the channnel-like extension, and corresponding slots 16 in the upper side of the said extension. The bolts $m$ and $n$ are provided with nuts $m'$ and $n'$ with extended flanges and with washers.

These bolts serve to hold the protective covering securely to the supplementary rims $e$ and $f$, and are provided with complementary coil springs 2 and 3 and 4 and 5 seated over the bolts, one on each side of the flanges $i$ and $j$ and bearing against the upper portions of the rims $e$ and $f$ and the nuts $m'$ and $n'$ and the washers, thus holding my protective armor securely to the tire.

The usual rim clamps 6 are provided for mounting the tire to the wheel as shown in Fig. 5.

The two sections of my protective covering $c$ and $d$ are provided with male and female joints 10 and 11 which permit the two sections to be slightly adjustable to the change in circumference of the tire, and a liner 18 is provided between the supplementary rims $e$ and $f$ and the shoulders of my protective covering to provide a dust proof connection.

The radially disposed bolts $m$ and $n$ are subject to a slight lateral movement when the tire is deflated and the two sections of the armor are forced closer together, and this lateral movement is provided for by the slots 12 and 13 in the outturned flanges $i$ and $j$ being made large enough to accommodate this movement of the bolts.

A rubber tread 20 is fixed on the outer periphery of my protective cover to provide better traction on the road surface.

The assembly of my protective covering over the tire is as follows.

The tire $b$ is mounted on the wheel $g$ in the usual manner, but is deflated and my protective armor is placed over the tire, one section at a time and closely fitted together at the joints 10 and 11. The wheel is laid on its side and the springs 2 are placed adjacent to the slots 12 in the flange $i$ and the supplementary rim $e$ is placed over the outturned flange $i$, the springs 3 are placed over the bolts $m$ and the said bolts are inserted through the opening 16 in the supplementary rim $e$ and through the springs 2, and the nuts $m'$ are then threaded onto the said bolts $m$. The rim $f$ is then assembled about the other side of the wheel, and both the supplementary rims $e$ and $f$ are bolted onto the felly of the wheel by the transverse bolts $h$ and my protective cover is mounted over the tire and ready to be used.

The radial adjustment of my protective cover as before mentioned is provided for by the play allowed between the bolts $m$ and $n$ in the slots 12 and 13, respectively.

When a tire is inflated the joints 10 and 11 between the two sections of my cover will not be completely closed, but in case the air should escape from the tire, the sections $c$ and $d$ will be forced together by the springs 3 and 5, and the weight of the automobile thus forming a rigid and inflexible guard thereby making it possible to drive an automobile equipped with my protective covering for pneumatic tires when the enclosed tire is deflated without damage to the tire or the customary jolting of the car.

The sections of my protective covering are held snugly around the inflated tire by the tension of the springs on the radially disposed bolts, thereby preventing any independent movements on the rims, and providing a practical and useful covering for tires, which will eliminate all possibility of tire trouble from anything, but the old age of the tire.

I claim:

The combination with a vehicle and the pneumatic tire mounted thereon of a protective cover for the tire, said cover consisting of circular metallic, resilient slidably connected segments, U-shaped in cross section, said segments adapted to be placed on the tire to encompass the tread and sides thereof, the interior periphery of the said segments terminating in outwardly projecting flanges perpendicular to the longitudinal plane of the wheel, a ring removably mounted on each side of the rim of the wheel, each of said rings provided with offset portions housing the adjacent flange, said housing adapted to provide bearing-surfaces located opposite to but spaced from the sides of said flange, radially arranged springs within said housing on each side of said flange bearing against the latter and the opposed bearing-surface of the housing, and a bolt inserted through the said flange, the said bearing surfaces of the housing and said springs respectively, the bearing surfaces being cut away to receive said springs, and washers on the bolts exterior the housing, and a nut threaded on the bolt.

FLOYD MOTT.